(12) United States Patent
Knudsen et al.

(10) Patent No.: US 6,376,767 B1
(45) Date of Patent: Apr. 23, 2002

(54) AIR GUN CABLE

(75) Inventors: Anton Knudsen, Son; Lars Oyvind Moen, Oslo, both of (NO)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/587,911

(22) Filed: Jun. 6, 2000

(30) Foreign Application Priority Data

Jun. 10, 1999 (NO) ................................................. 992834

(51) Int. Cl.⁷ ................................................. F16L 11/12
(52) U.S. Cl. ........................... 174/47; 138/137; 367/20; 367/144
(58) Field of Search ............... 174/47, 120 R, 174/70 R, 70 S; 138/110, 137, 140, 149; 367/20, 144

(56) References Cited

U.S. PATENT DOCUMENTS

| 3,907,955 | A | * | 9/1975 | Viennot ........................ 264/105 |
| 4,196,307 | A | * | 4/1980 | Moore et al. ................. 174/47 |
| 4,525,813 | A | * | 6/1985 | Burrage ........................ 367/20 |
| 4,597,065 | A | * | 6/1986 | Lien et al. ..................... 367/20 |
| 4,725,693 | A | * | 2/1988 | Hirsch ........................ 174/107 |
| 4,765,711 | A | * | 8/1988 | Obst ........................ 174/70 R |
| 5,138,684 | A |   | 8/1992 | Bullock et al. |
| 5,362,921 | A | * | 11/1994 | Birkelund et al. ............. 174/47 |
| 5,506,818 | A | * | 4/1996 | Johnston ..................... 367/144 |
| 5,613,524 | A | * | 3/1997 | Martucci ..................... 138/137 |
| 5,902,958 | A | * | 5/1999 | Haxton ........................ 174/47 |
| 6,012,495 | A | * | 1/2000 | Antonsen ..................... 138/131 |
| 6,016,845 | A | * | 1/2000 | Quigley et al. ............. 138/125 |
| 6,268,567 | B1 | * | 7/2001 | Brodsky et al. ......... 174/117 F |

FOREIGN PATENT DOCUMENTS

NO            911099           3/1991

\* cited by examiner

Primary Examiner—Dean A. Reichard
Assistant Examiner—Adolfo Nino
(74) Attorney, Agent, or Firm—Sughrue Mion, PLLC

(57) ABSTRACT

In a cable with a pneumatic hose, a sheath (9) encloses the hose and conductor elements (6) which are disposed between the sheath (9) and the hose. A layer of compressible material (5) is disposed between the conductor elements (6) and the hose.

6 Claims, 1 Drawing Sheet

AIR GUN CABLE

BACKGROUND OF THE INVENTION

The present invention relates to a cable with a pneumatic hose, a sheath which encloses the hose and conductor elements disposed between the sheath and the hose.

For marine seismic exploration, acoustic signals are generated in the sea by air guns which operate on pressurised air and which are towed behind a vessel. A cable comprising a pneumatic hose connects the air guns to a pressure source on the vessel, e.g. a compressor, which supplies the pressurised air. The hose is generally made of a pressure resistant flexible material with high tensile strength like nylon and it is located on the axis of the cable. Typically, the cables have a length of several 100 meters and are stored on reels on the vessel for transport between the areas which are to be explored.

Furthermore, the cable comprises conductor elements for power and signal transmission. The conductors can be either electrical conductors, e.g. single power conductors, pairs or quads, especially for data transmission, or optical fibres. The hose and the conductor elements are enclosed in a sheath. In many cases, the cable is provided with an armouring layer and an additional outer sheath.

To resist wear due to the repeated winding on and off the reel, the materials of the cable must be sufficiently flexible to avoid damaging. On the other hand, typical internal pressures of the hose are in the order of 200 bar. Therefore, the material of the hose must have sufficient tensile strength to avoid excessive variations in diameter when the pressure inside changes. Rapid and repeated pressure changes are especially caused by the firing of the air guns. Because sufficient flexibility and tensile strength cannot be attained at the same time, residual variations of the hose diameter often cause damage of the conductor elements disposed around the hose, especially if an outer armouring of the cable prevents a displacement of the conductors corresponding to the hose diameter. Consequently, the conductors often fail prematurely.

Although the hose is basically gas-tight, it is a further problem that a low rate of leaking gas cannot be excluded. As a result, small amounts of air leak into the outer layer of the cable and form air pockets which can cause damage of the cable.

SUMMARY OF THE INVENTION

It is, therefore, an object of the present invention to obviate these disadvantages and to develop an air gun cable which is highly reliant over a long period of time. It is a further object, to provide an air gun cable which avoids the development of air pockets inside the cable.

According to the invention, a layer of compressible material is disposed between the conductor elements and the hose.

The hose consists of a material with high tensile strength, e.g. nylon or another polyamide. In addition, the hose is preferably provided with an armouring, for example two or more layers of aramide yarn. In this way, variations in diameter due to changing, pressure inside the hose are limited while the hose has a good flexibility. Remaining variations in diameter are accommodated by a layer of compressible material which is disposed around the hose and between the hose and the conductor elements. If the diameter of the hose increases, the compressible material is deformed and mechanical stress on the conductors is avoided. If the diameter of the hose decreases due to low pressure inside, the compressible material expands elastically and ensures a tight fit of all elements in the cable. Because the material of the hose allows only relatively small variations in diameter, a thickness of the buffer layer between 1 and 5 mm, preferably approximately 2 mm, is sufficient in most cases.

The layer of compressible material contains a high percentage of interstices filled with air or another gas. The interstices can be compressed by outer forces and expand due to the elastic properties of the surrounding material upon release of the forces. The layer can consist of a single material or a combination of several materials. The latter embodiment has the advantage that a combination of different materials can more easily be tailored to obtain the necessary mechanical parameters of the layer.

The conductor elements are disposed in a layer around the compressible layer. Preferably, the conductor elements form a continuous layer although the layer can also consist of conductor elements which are spaced apart. If the necessary number of conductors is not sufficient to fill a complete layer, spare conductors can be used to obtain the required number and for back-up in case a conductor fails. If a large number of conductor elements is to be accommodated in the cable, two or more layers of conductor elements can be disposed around the hose. A sheath surrounds the conductor elements and the hose.

The proposed air gun cable is highly reliant over a long period of time because the layer of compressible material avoids mechanical stress on the conductor elements when the pressure inside the hose varies. Furthermore, the layer also reduces the stress on the conductor elements when the cable is wound on or off the reel. Premature failing of the conductors is considerably reduced.

In a preferred embodiment, the layer of compressible material comprises a polymer yarn. A suitable material is a polypropylene yarn. The compressibility of the layer can be adjusted by the density ratio of yarn threads to interstices.

A preferred layer of compressible material comprises a filling material, e.g. a meltable polymer to fill the interstices. If the filling material is incompressible, only a part of the interstices should be filled to leave empty interstices which can be compressed. Suitable filling materials are soft thermoplastic filling compounds which are sufficiently flexible to accommodate diameter variations of the hose and allow the bending of the cable.

Furthermore, the layer of compressible material can consist of or comprise an elastic polymer foam, for example a polyurethane foam, which has a high degree of compressibility.

The outermost layer of the hose generally has small openings which can be formed by pin pricking of this layer. This avoids that leaking gas accumulates inside the wall of the hose. Preferably, the layer of compressible material is porous for conducting gas in the longitudinal direction of the cable. The pores can be gaps between the threads of the polymer yarn.

In an advantageous embodiment, the layer of compressible material comprises an outer cover. A preferred cover is a polymer tape, e.g. a polyurethane tape. The cover protects the compressible layer from damage and simplifies the handling during manufacturing of the cable. If the layer is used for conducting air in the longitudinal direction of the cable a closed cover, e.g. a tape layer, constitutes a seal for guiding the air thus avoiding that air leaks out between the conductor elements. In the case that the compressible layer comprises a filling material, this can be an adhesive which provides a safe connection between the tape and the other elements of the compressible layer.

To avoid damage of the cable during use, the sheath is enclosed by an armouring and an additional outer sheath. The armouring preferably consists of steel wires protected against corrosion. In addition, the armouring allows the weight of the cable per unit length to be adjusted to obtain the required buoyancy.

Interstices between the conductor elements are preferably filled with a filling compound which avoids spreading of water in the longitudinal direction of the cable, for example if the sheath is damaged. A suitable filling compound is a hydrophobic grease. A filling compound is preferably also used to seal interstices within the individual conductor elements.

The foregoing and other objects, features and advantages of the present invention will become more apparent in the following detailed description of preferred embodiments as illustrated in the accompanying drawing.

DETAILED DESCRIPTION OF THE INVENTION

Figure 1A:
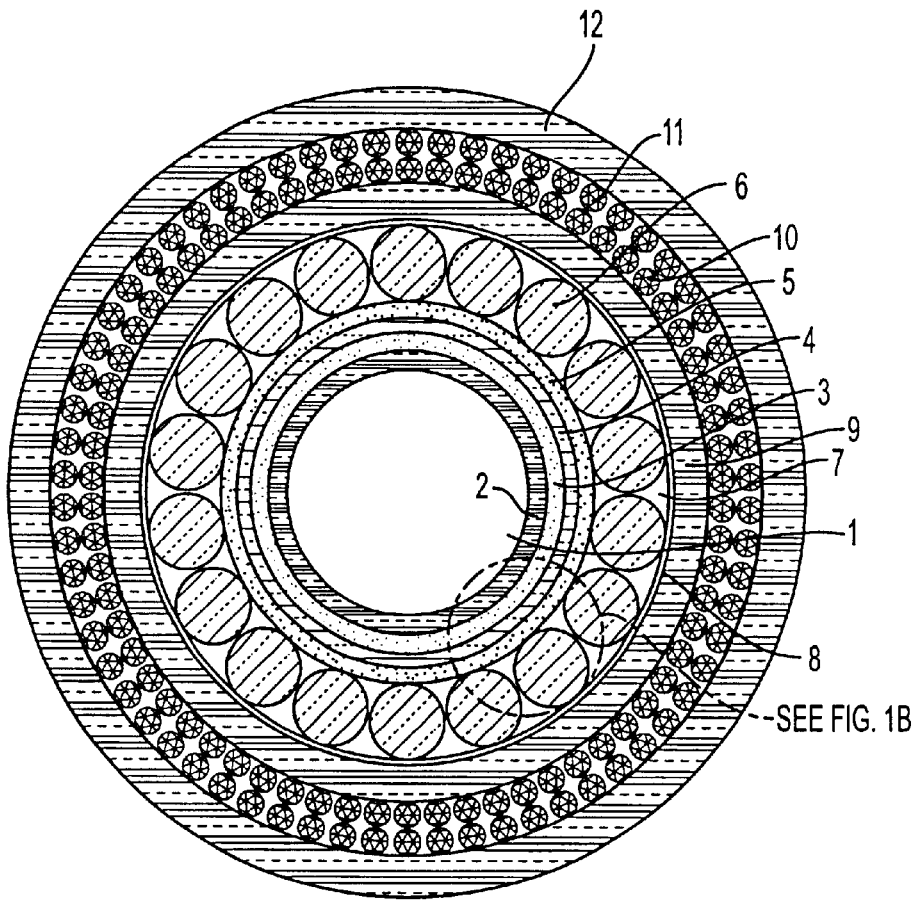
FIG. 1A is a cross section through a cable according to the invention.
Figure 1B:
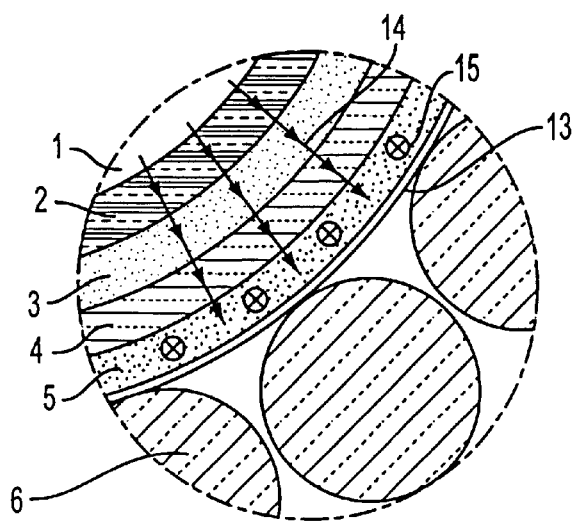
FIG. 1B is an exploded view of a portion of FIG. 1A.

FIGS. 1A and 1B show an air-gun cable according to the invention. In the centre of the cable, a hose with an opening 1 allows air to be conducted with a pressure in the range of several 100 bars to air guns at the end of the cable. Depending on the length of the cable and the pressure inside, a suitable diameter of the opening 1 is the range of one to several centimeters. The inner lining 2 of the hose consists of a polymer layer, e.g. of Nylon 11, which is basically gas-tight. A double layer of braided aramide yarn 3 provides the armouring of the hose. The hose is covered with an outer jacket 4. Small openings in the jacket 4 are formed by pin pricking. They allow air which diffuses through the inner lining 2 into the yarn layer 3 to leak out of the hose to avoid air pockets which would destroy the hose upon pressure variations.

The central hose is surrounded by a compressible layer 5 with a thickness of approximately 2 mm. The layer 5 consists of polypropylene yarn with interstices. The interstices allow the compression of the layer 5 and form pores which conduct air leaking from the hose into the compressible layer 5 to the ends of the cable where means for letting out the air, e.g. a valve, can be provided. A part of the interstices is filled with a soft thermoplastic filling compound. The enlarged cross-section of the cable in the region of the compressible layer 5 shows that the layer 5 comprises an outer cover 13. It consists of a polyurethane tape which adheres to the yarn through the filling compound and avoids that air leaks into the outer layers of the cable. The flow of air leaking through the layers of the hose into the compressible layer 5 is indicated by arrows 14. Inside the layer 5, the air is conducted along the cable perpendicular to the plane of the figure as indicated by symbols 15.

On the outer cover 13 of the compressible layer 5, conductor elements 6 are disposed in a continuous layer. Suitable conductor elements 6 are for example power conductors which can comprise a single insulated strand of wires. Other conductor elements suited especially for data transmission are conductor pairs or quads which are preferably twisted and which can be screened. Suitable conductor elements are also fibre optic elements e.g. glass fibres in a tube.

As variations in the diameter of the hose are accommodated by the compressible layer 5, mechanical stress on the conductor elements 6 due to changing pressure inside the hose is significantly reduced. Gaps between the conductor elements 6 are filled with a hydrophobic filling compound 7 to avoid spreading of water along the cable. A wrapping 8 consisting of polyester tape holds the conductors in place. Instead of a single layer, two or more layers of conductor elements 6 can be provided.

The hose and the conductors are enclosed in an inner sheath 9, e.g. a polyurethane sheath. Two layers of galvanised steel wires 10, 11 form the armouring of the cable. They can have different diameters and are preferably provided with a polymer coating to improve the resistance against corrosion. An outer sheath 12 of a mechanically robust material, e.g. nylon, encloses the cable.

The above embodiments admirably achieve the objects of the invention. However, it will be appreciated that departures can be made by those skilled in the art without departing from the scope of the invention which is limited only by the claims.

What is claimed is:

1. Cable with a pneumatic hose, a sheath (9) which encloses the hose and conductor elements (6) disposed between the sheath (9) and the hose, characterised in that a layer of compressible material (5) is disposed between the conductor elements (6) and the hose.

2. Cable according to claim 1, characterised in that the layer of compressible material (5) comprises a polymer yarn.

3. Cable according to claim 1, characterised in that the layer of compressible material (5) comprises a filling material.

4. Cable according to claim 1, characterised in that the layer of compressible material (5) comprises a polymer foam.

5. Cable according to claim 1, characterised in that the layer of compressible material (5) is porous for conducting gas in the longitudinal direction of the cable.

6. Cable according to claim 1, characterised in that the layer of compressible material (5) comprises an outer cover.

* * * * *